United States Patent
Clark et al.

(10) Patent No.: US 9,120,123 B2
(45) Date of Patent: Sep. 1, 2015

(54) SPRAY NOZZLE

(75) Inventors: Daniel Clark, Belper (GB); James Kell, Nottingham (GB); Jeffrey Allen, Derby (GB)

(73) Assignee: ROLLS-ROYCE plc, London (GB)

( * ) Notice: Subject to any disclaimer, the term of this patent is extended or adjusted under 35 U.S.C. 154(b) by 494 days.

(21) Appl. No.: 12/974,416

(22) Filed: Dec. 21, 2010

(65) Prior Publication Data

US 2011/0168092 A1 Jul. 14, 2011

(30) Foreign Application Priority Data

Jan. 12, 2010 (GB) .................................. 1000436.4

(51) Int. Cl.
| | | |
|---|---|---|
| B05B 5/00 | (2006.01) | |
| B23K 26/00 | (2014.01) | |
| B05D 1/30 | (2006.01) | |
| B23K 26/14 | (2014.01) | |
| B23K 26/34 | (2014.01) | |

(52) U.S. Cl.
CPC .............. *B05D 1/30* (2013.01); *B23K 26/1411* (2013.01); *B23K 26/1458* (2013.01); *B23K 26/34* (2013.01)

(58) Field of Classification Search
CPC ....................................................... B05C 19/00
USPC ........... 118/308, 309, 641–643, 313–315, 62, 118/63; 219/121.63, 121.64, 121.65, 219/121.66, 121.84; 427/596, 553, 595, 427/255.4; 239/696, 318
See application file for complete search history.

(56) References Cited

U.S. PATENT DOCUMENTS

| | | | | |
|---|---|---|---|---|
| 3,767,116 A | * | 10/1973 | Clausen et al. | ................ 239/696 |
| 3,870,232 A | * | 3/1975 | Lacchia | ........................ 239/696 |
| 4,798,340 A | * | 1/1989 | Vohringer et al. | ............ 239/692 |
| 5,993,544 A | | 11/1999 | Keicher et al. | |
| 5,993,554 A | | 11/1999 | Keicher et al. | |
| 6,046,426 A | * | 4/2000 | Jeantette et al. | .......... 219/121.63 |
| 6,268,584 B1 | * | 7/2001 | Keicher et al. | ............ 219/121.64 |
| 6,316,744 B1 | | 11/2001 | Nowotny et al. | |
| 6,391,251 B1 | * | 5/2002 | Keicher et al. | ..................... 419/7 |
| 2002/0170890 A1 | * | 11/2002 | Keicher et al. | ............ 219/121.64 |
| 2003/0074096 A1 | * | 4/2003 | Das et al. | ....................... 700/119 |

FOREIGN PATENT DOCUMENTS

| | | |
|---|---|---|
| CN | 2838760 Y | 11/2006 |
| EP | 1 887 107 A2 | 2/2008 |
| WO | WO 2004/101164 A1 | 11/2004 |

OTHER PUBLICATIONS

British Search Report dated Jan. 26, 2010 in British Patent Application No. GB1000436.4.
European Search Report issued in European Application No. EP 10 19 5045 dated May 27, 2011.

* cited by examiner

*Primary Examiner* — Yewebdar Tadesse
(74) *Attorney, Agent, or Firm* — Oliff PLC

(57) ABSTRACT

A spray nozzle 10 for a laser deposition apparatus comprises an array of nozzle apertures 16 arranged side-by-side, and a powder supply chamber 18 in fluid communication with the nozzle apertures 16. In use the powder supply chamber 18 supplies powder to the nozzle apertures 16 under pressure so as to cause a wide powder stream to be discharged from the array of nozzle apertures 16. When used with a laser deposition apparatus 100, a relatively wide coating of a uniform thickness can be deposited.

11 Claims, 11 Drawing Sheets

Figure 1:
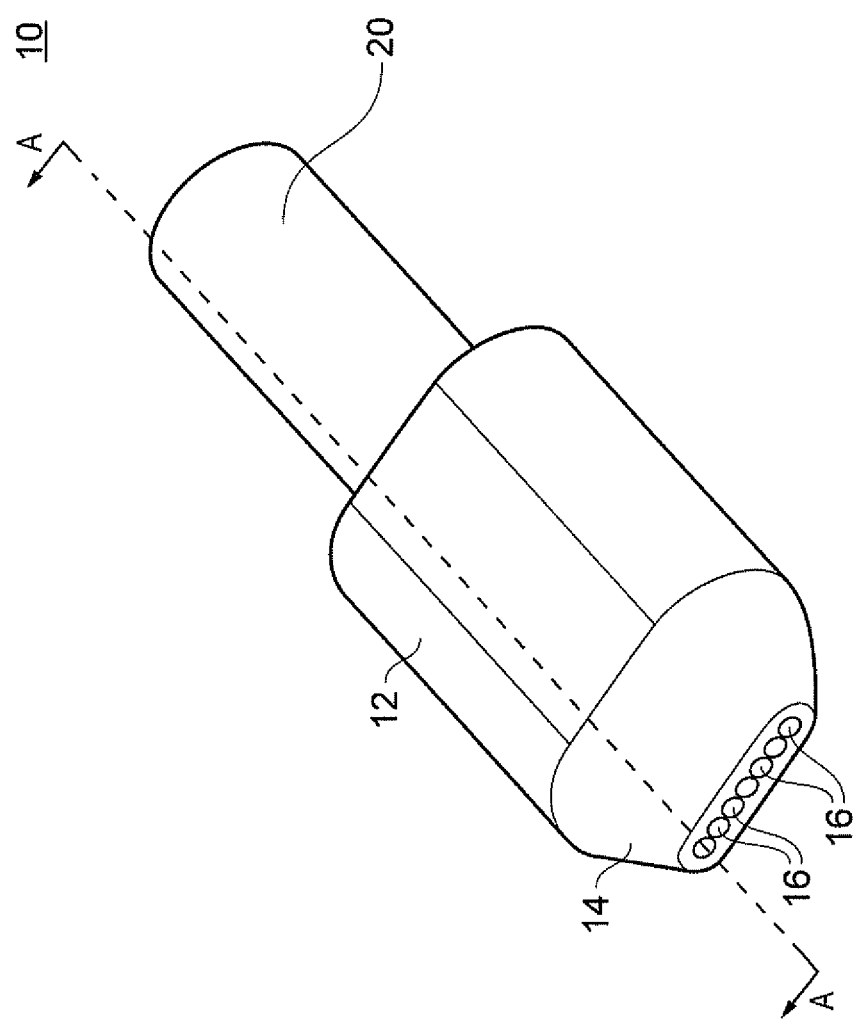

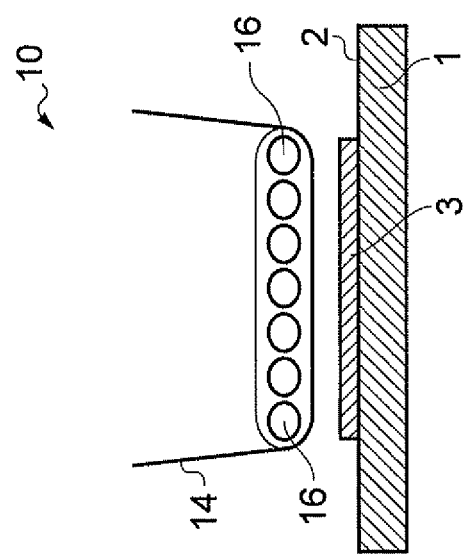
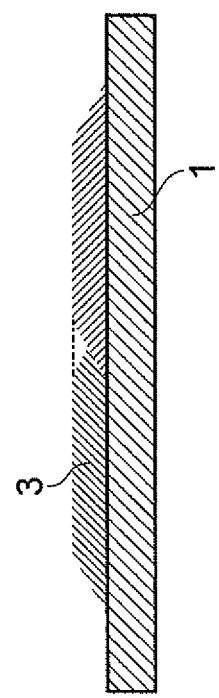
FIG. 5a
FIG. 5b

SPRAY NOZZLE

The present invention relates to a spray nozzle for a laser deposition apparatus.

Laser cladding is a technique that is generally used either to deposit a coating onto a component in order to rebuild the component, or to deposit a coating onto a substrate in order to provide a protective layer.

A laser cladding apparatus typically comprises a laser which forms a molten pool on a substrate into which a stream of metal powder entrained in a gas can be blown. This results in a track (otherwise known as a clad) being deposited on the substrate. U.S. Pat. No. 6,316,744 discloses a laser cladding apparatus in which the metal powder is delivered coaxially with, and around, the laser beam.

The intensity of the laser beam usually has a Gaussian distribution which means that the centre of the melt pool is at a significantly higher temperature than the temperature of the surrounding areas. If it is necessary to deposit a relatively wide coating then this must be done by overlapping a series of clads side-by-side. If only the laser beam diameter is increased then the temperature at the centre of the melt pool is such that high levels of vaporisation of additive material may occur, or the substrate may melt to an excessive depth. Further, the surrounding substrate material may be disrupted to an excessive depth and the deposited coating may dilute into the substrate. In some application dilution of the clad by the parent substrate may occur. If a number of clads are overlapped side-by-side then the reworking of previously deposited clads can induce unwanted material properties. Further, cavities may form between adjacent clads which is undesirable, and the surface formed may be uneven.

It is therefore desirable to provide a spray nozzle for laser deposition and a laser deposition apparatus capable of depositing wide coating layers of a substantially uniform thickness.

According to a first aspect of the present invention there is provided a spray nozzle for a laser deposition apparatus, comprising: an array of nozzle apertures arranged side-by-side; and a powder supply chamber in fluid communication with the nozzle apertures and arranged in use to supply powder to the nozzle apertures under pressure so as to cause a wide powder sheet to be ejected from the array of nozzle apertures.

Preferably the array of nozzle apertures is a linear array. The nozzle apertures may be of differing sizes. The nozzle apertures towards the edges of the array may be larger than the nozzle apertures towards the middle of the array. There may be some applications where it is desirable to have larger nozzle apertures towards the centre or towards a side of the array. Larger apertures towards a side of the array may help the formation of radial tracks, for example hard-facing of gate valves.

At least one nozzle aperture within the array may be provided with a flow regulator for regulating the flow of powder through the said nozzle. In a preferred arrangement each nozzle aperture within the array is provided with an individual flow regulator for regulating the flow of powder through it.

The spray nozzle may further comprise upper and lower elongate gas apertures located above and below the array of nozzle apertures respectively that extend substantially parallel to the array of nozzle apertures, wherein the upper and lower elongate apertures are arranged to eject a wide gas stream above and below the wide powder sheet.

The spray nozzle may further comprise upper and lower guide plates located above and below the array of nozzle apertures respectively that extend so as to guide the flow of powder ejected from the spray nozzle in use.

A wall of the powder supply chamber may be provided with ribs which extend generally in the direction of flow through the powder supply chamber in use. These ribs would help to guide the flow. Alternatively or in addition, the powder supply chamber may be provided with baffles which extend generally in a direction perpendicular to the direction of flow through the powder supply chamber in use. Such baffles would help to promote turbulence in the supply chamber.

Preferably the array of nozzle apertures is formed in a nozzle body, i.e. a single integral unit.

The invention also concerns a laser deposition apparatus comprising a laser arranged to generate a wide laser beam and a spray nozzle in accordance with any statement herein.

The invention may comprise any combination of the features and/or limitations referred to herein, except combinations of such features as are mutually exclusive.

Figure 2:
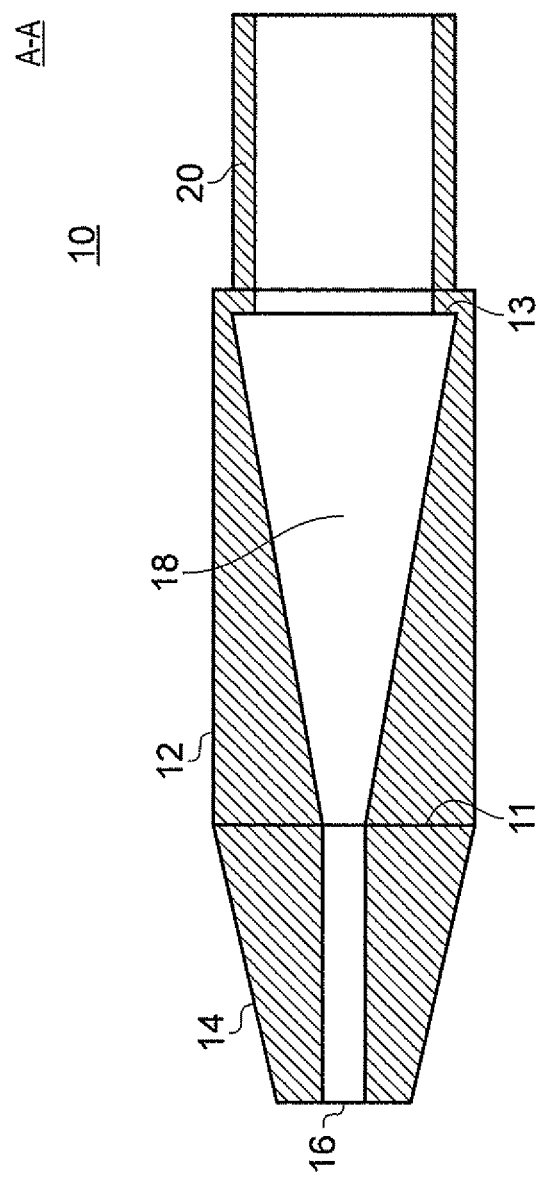
Figure 3:
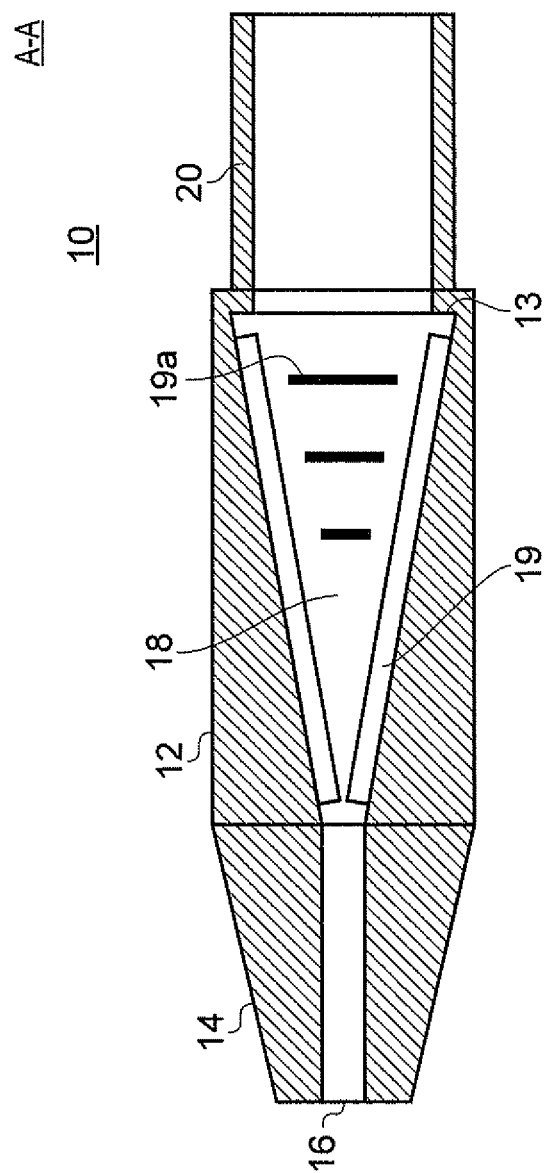
Figure 4:
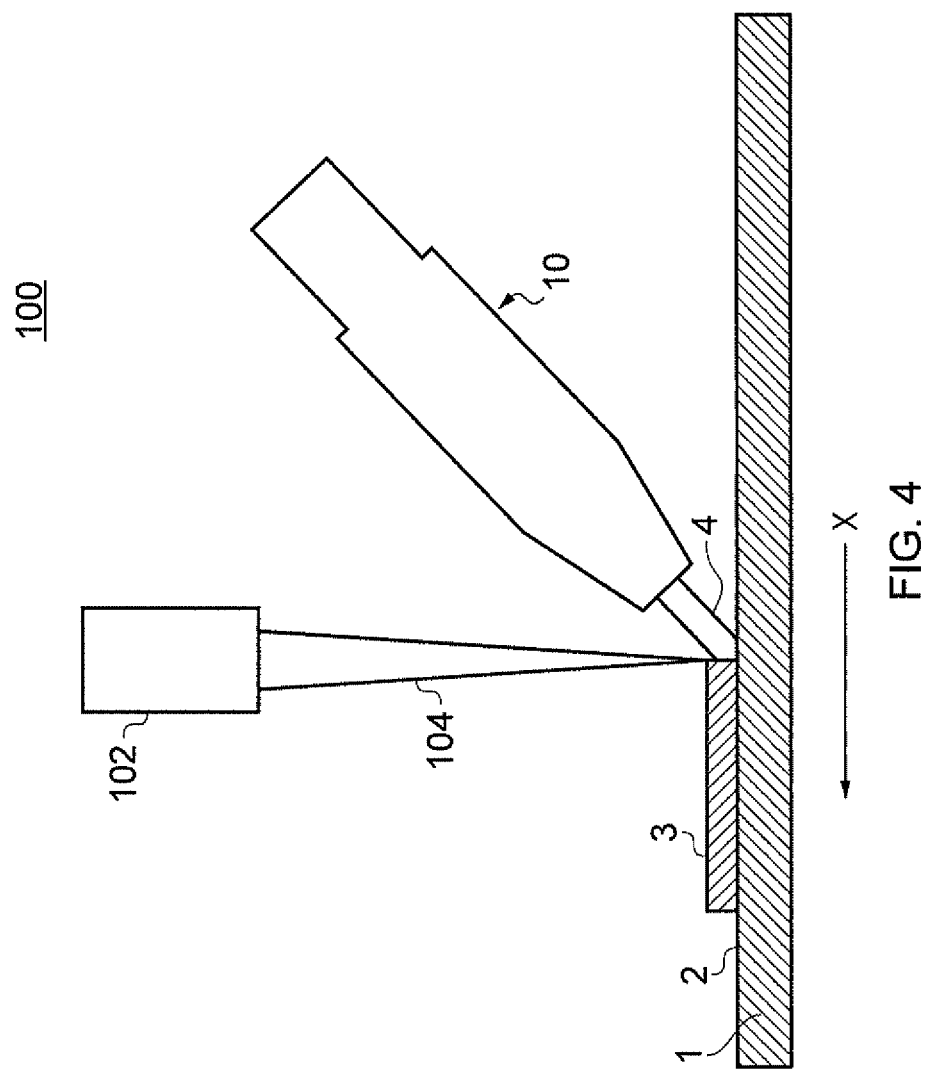
Figure 6:
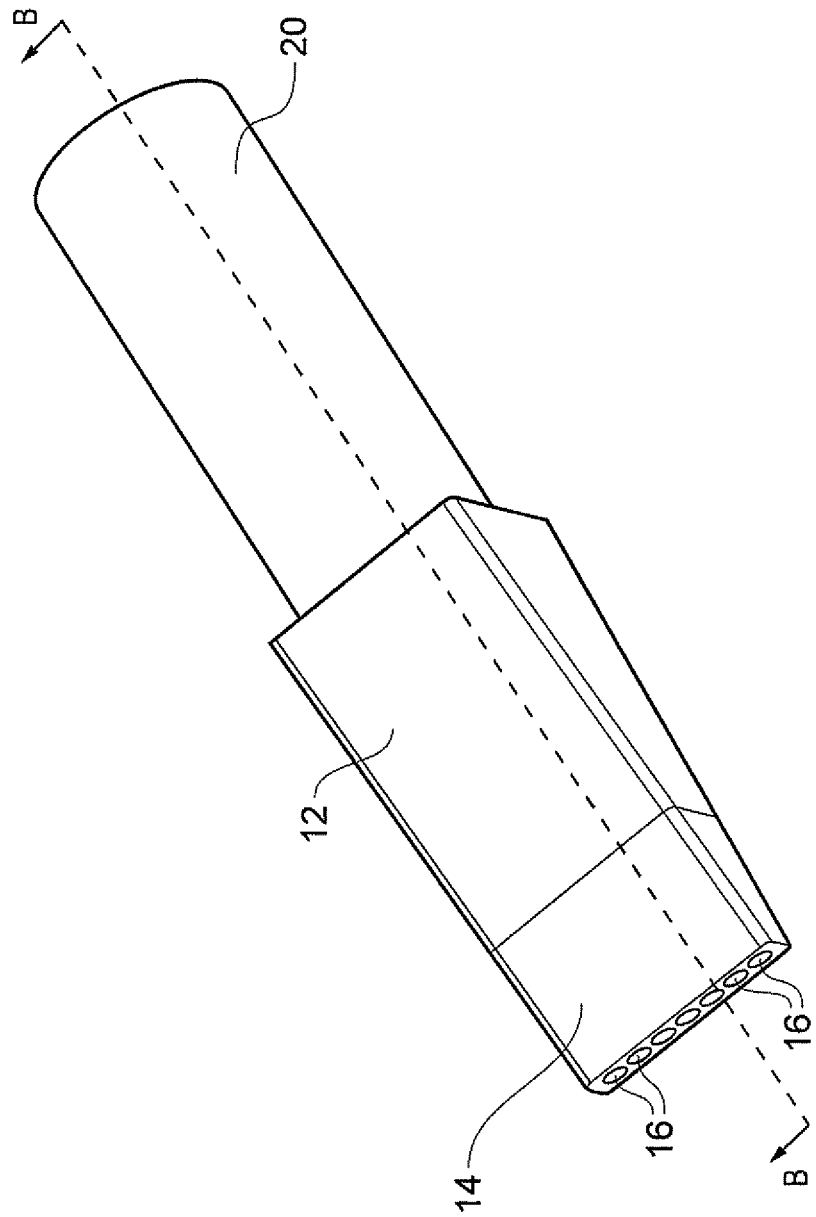
Figure 7:
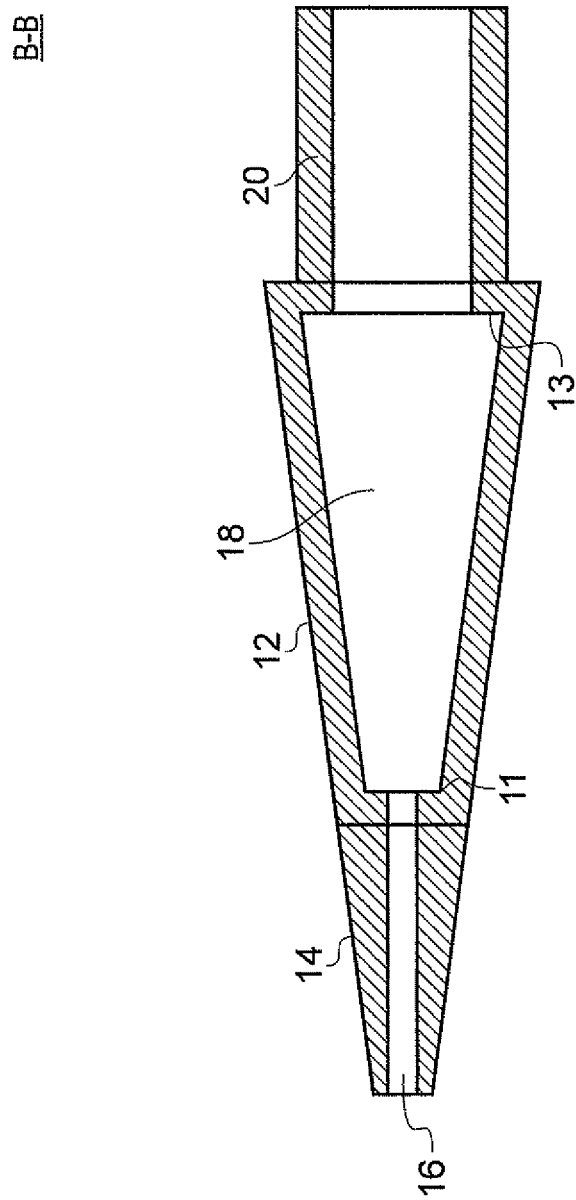
Figure 8:
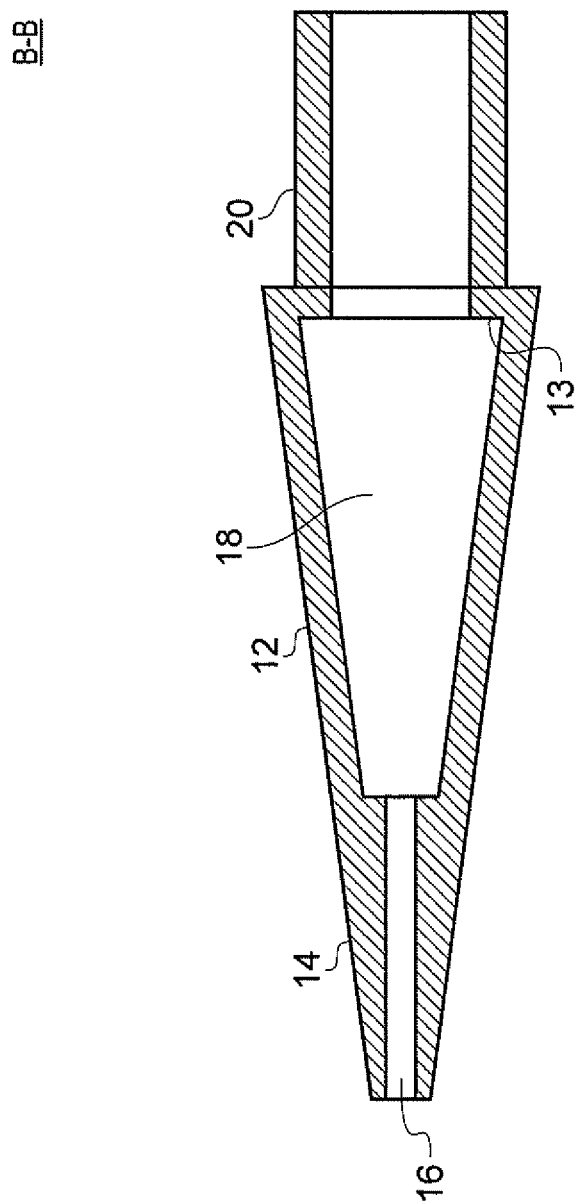
Figure 9:
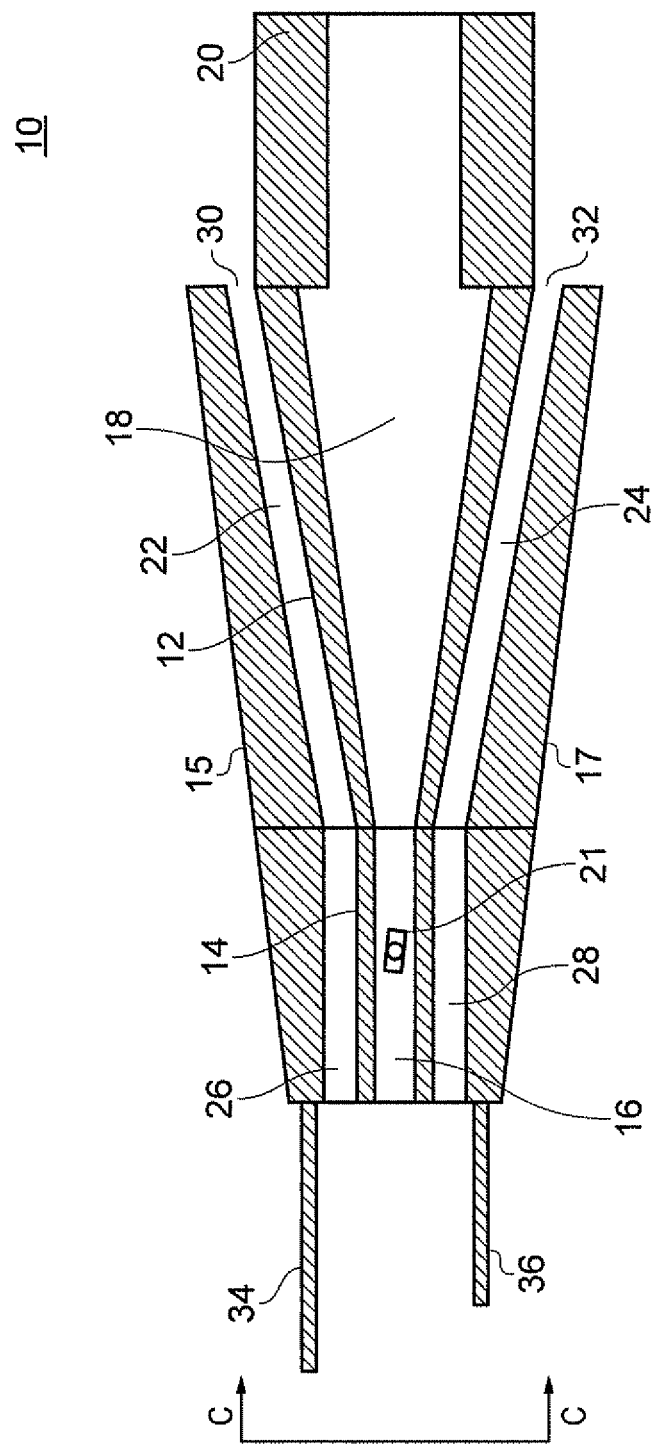
Figure 10:
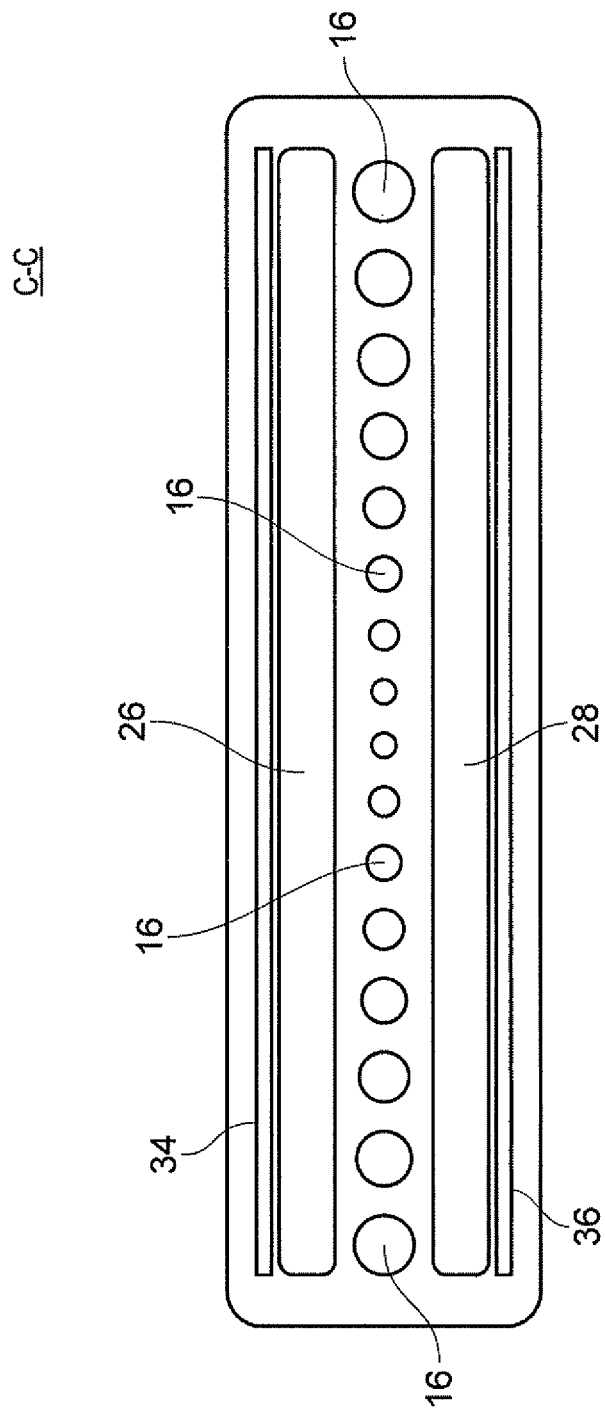

Embodiments of the present invention will now be described, by way of example only, with reference to the accompanying drawings, in which:

FIG. 1 schematically shows a spray nozzle according to a first embodiment;

FIG. 2 schematically shows the cross-sectional view A-A of the spray nozzle of FIG. 1;

FIG. 3 schematically shows an alternative cross-sectional view A-A of the spray nozzle of FIG. 1;

FIG. 4 schematically shows a laser cladding apparatus including a spray nozzle;

FIGS. 5a and 5b schematically show an end view of the spray nozzle of FIG. 1 and a coating layer deposited using it;

FIG. 6 schematically shows a spray nozzle according to a second embodiment;

FIG. 7 schematically shows the cross-sectional view B-B of the spray nozzle of FIG. 6;

FIG. 8 schematically shows an alternative cross-sectional view B-B of the spray nozzle of FIG. 6;

FIG. 9 schematically shows a cross-sectional view of a spray nozzle according to a third embodiment;

FIG. 10 schematically shows an end view of the spray nozzle of FIG. 9; and

Figure 11:
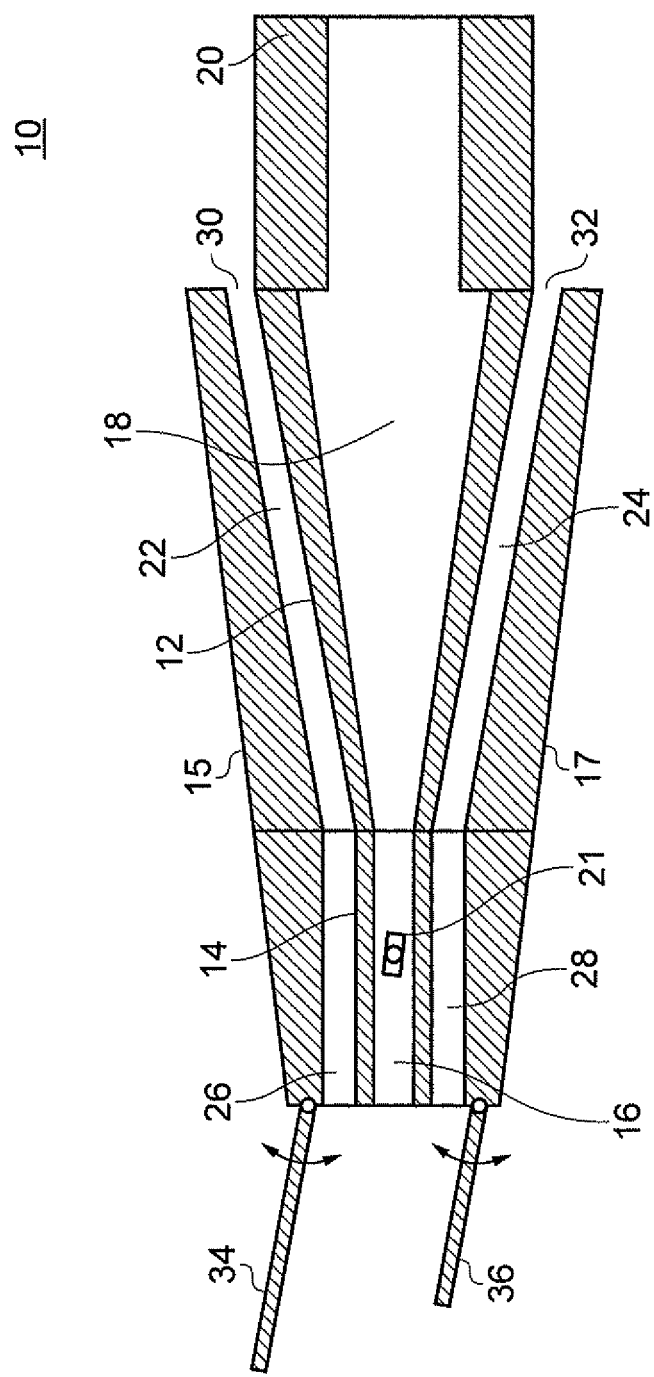

FIG. 11 schematically shows a cross-sectional view of a spray nozzle according to a fourth embodiment.

FIGS. 1 and 2 show a spray nozzle 10 comprising a chamber body 12, a nozzle body 14 and a supply duct 20. An array of nozzle apertures 16 is provided in the end of the nozzle body 16. The array of nozzle apertures comprises a plurality of individual nozzle apertures 16 arranged side-by-side. The nozzle apertures 16 extend through the nozzle body 14 and lead to a powder supply chamber 18 which is formed by the chamber body 12. The chamber body 12 has end walls 11, 13 that abut the nozzle body 14 and the supply duct 20 respectively. As can be seen from the sectional view A-A, the powder supply chamber 18 has cross-sectional area that tapers towards the array of nozzle apertures and is in fluid communication with the supply duct 20. However, in other embodiments the powder supply chamber 18 may have a substantially constant cross-sectional area. The nozzle apertures 16 are arranged in series and the centres of the nozzle apertures 16 lie on a straight line. In other embodiments the nozzle apertures 16 may be arranged in a different geometry. The nozzle body 14, the chamber body 12 and the supply duct 20 may be formed from separate components welded together. Alternatively, they may be integrally formed with one another.

In use, metal powder is supplied to the spray nozzle 10 via the supply duct 20 under pressure using a carrier gas. The metal powder and carrier gas mix in the powder supply chamber 18, which acts as a plenum chamber, and the powder exits the array of nozzle apertures 16 as a wide sheet (or stream) of powder.

As shown in FIG. 3 the powder supply chamber 18 may be provided with longitudinally extending ribs 19. The ribs 19 help to ensure laminar flow and also act to stiffen the spray nozzle 10. However, transverse baffles 19a may be provided in addition or instead in order to produce a turbulent flow.

With reference to FIG. 4, the spray nozzle 10 may be used with a laser cladding apparatus 100 which is arranged to deposit a coating 3 onto the surface 2 of a substrate 1. In addition to the spray nozzle 10, the laser cladding apparatus 100 comprises a laser 102 capable of generating a wide laser beam 104, means for moving the substrate 1 and a powder feeder (not shown) for feeding a metal powder to the nozzle 10 via the supply duct 20. As the substrate 1 is moved in direction X, the nozzle 10 emits a sheet (or stream) of powder 4 which interacts with the laser beam 104. As the powder sheet 4 meets the laser beam 104 it is melted to form a melt pool on the substrate surface 2, which solidifies as a coating 3 on the surface 2. The width of the laser beam 104 is comparable to that of the powder sheet 4 which ensures that the whole width of the powder sheet 4 is melted and deposited as a coating 3. The wide laser beam 104 may be generated by any of the following beam manipulation techniques: scanning, diode, refractive, diffractive, ancillary, array. Multiple laser beams could also be used side-by-side in order to generate a wide laser beam. Other techniques for generating a wide laser beam will be readily apparent to one skilled in the art.

The metal powder may be of a uniform composition or may be a mixture of two or more powders. The carrier gas may be an inert gas such as argon, for example. Within the powder supply chamber 18 the metal powder and carrier gas mix in order to ensure that the powder sheet 4 delivered by the nozzle apertures 16 is uniform in both composition and delivery rate.

As shown in FIG. 5a, the laser cladding apparatus 100 described above can deposit a wide coating 3 of a substantially uniform thickness. The width of the coating 3 is approximately the same as the width of the array of nozzle apertures 16. The edges of the coating are substantially perpendicular to the substrate surface 2. This allows another coating layer to be deposited next to it without requiring an overlap and therefore results in a coating having a substantially flat surface. This improves the mechanical properties of the cladding 3 and reduces the overall amount of material used when compared with a conventional apparatus that deposits a number of narrow, domed, coating layers side-by-side and overlapping.

Further, a flat deposition can be provided by overlapping clads and tailoring the thickness of the clads at the edge of each clad. For example, as shown in FIG. 5b overlapping clad tracks 3 having angled edges results in a flat deposition layer.

The powder flow from the spray nozzle can be regulated in order to alter the mass flow distribution of the powder according to the clad width and/or thickness required. The powder flow can be controlled and regulated from the primary powder feed system.

The array of nozzles apertures 16 can be altered to produce a clad of a desired geometry. Specifically, the number, size and relative positions of nozzle apertures 16 can be configured so as to produce a clad of a desired shape.

FIGS. 6 and 7 show a second embodiment of a spray nozzle 10 which can be used with the laser cladding apparatus of FIG. 4. This is similar to the embodiment of FIGS. 1-3 except the chamber body 12 and the nozzle body 14 are both tapered towards the nozzle apertures 16. As can be seen from the cross-sectional view B-B, the powder supply chamber 18 tapers towards the nozzle apertures 16.

FIG. 8 shows a variation of the second embodiment in which the chamber body 12 and the nozzle body 14 are integrally formed.

FIGS. 9 and 10 show a third embodiment of a spray nozzle 10 which can be used with the laser cladding apparatus 10 of FIG. 4. An array of nozzle apertures 16 are formed in the nozzle body 14 and are arranged side-by-side in a line with the centre of the apertures 16 all lying on the same line. The plurality of nozzle apertures 16 that constitute the array are of varying sizes. Specifically, the nozzle aperture 16 at each end of the array is the largest and the nozzle apertures gradually decrease in size towards the middle of the array. Each of the nozzle apertures 16 is provided with an individual flow regulator in the form of a valve 21. The valve 21 can be controlled to alter the flow rate through the specific nozzle 16.

Upper and lower outer walls 15, 17 are spaced from the chamber body 12 and the nozzle body 14 and define upper and lower fluid ducts 22, 24 between the walls 15, 17 and the chamber/nozzle body 12, 14. The upper and lower fluid ducts 22, 24 have upper and lower inlets 30, 32 respectively for introducing a gas into the ducts 22, 24. The upper and lower outer walls 15, 17 also define an upper elongate gas aperture 26 above the array of nozzle apertures 16 and a lower elongate gas aperture 28 below the array of nozzle apertures 16. The upper and lower elongate gas apertures 26, 28 are parallel to the array of nozzle apertures 16. When a gas is supplied to the ducts 22, 24 via the inlets 30, 32 the gas is discharged from the upper and lower elongate gas apertures 26, 28 as sheets. A chamber body 12 is provided which defines a powder supply chamber 18. The chamber body 12 is attached to the nozzle body 14 such that the powder supply chamber 18 is in fluid communication with the plurality of nozzle apertures 16. As in the embodiments of FIGS. 1-3 and 6-8, a supply duct 20 is attached to the chamber body 12 and in use delivers a powder to the powder chamber 18 so as to eject a wide powder sheet from the array of nozzle apertures 16.

Although the walls 15, 17 are shown in FIGS. 9 and 10 as being integral with the chamber body 12, they could form part of a separate fairing mounted over the chamber body 12. Such a fairing may be displaceable on the chamber body 12 and may terminate short of the end face of the chamber body 12 at which the nozzle body 14 emerges.

Upper and lower guide plates 34, 36 are attached to the outer walls 15, 17 and project away from the walls 15, 17 and nozzle body 14 in a direction substantially perpendicular to the end faces. It may be possible to vary the angle of the guide plates with respect to the nozzle body 14. The upper guide plate 34 is positioned just above the upper elongate gas aperture 26 and the lower guide plate 36 is positioned just below the lower elongate gas aperture 28. As can be seen from FIG. 9, the upper guide plate 34 is longer than, and therefore projects beyond, the lower guide plate 36.

The spray nozzle 10 can be used with the laser cladding apparatus 100 of FIG. 4 to deposit a coating 3 on the surface 2 of a substrate 1. In use, metal powder is fed to the powder supply chamber 18 through the supply duct 20 using a carrier gas. A carrier gas is also supplied to the upper and lower fluid ducts 22, 24 through the inlets 30, 32. The metal powder is mixed in the powder supply chamber 18 and is caused to exit the array of nozzle apertures 16 as a wide sheet of powder. The carrier gas exits the upper and lower elongate gas apertures 26, 28 as wide streams of gas sandwiching the powder sheet. The Coandă effect causes the streams of carrier gas to be attracted to the powder sheet ejected from the array of nozzle apertures 16 and helps to ensure that the powder is ejected from the array of nozzle apertures 16 as a sheet, the gas-entrained powder issuing as an uninterrupted lamellar flow. This ensures that a coating of an even thickness is deposited on the substrate and helps to prevent the powder sheet from diverging. Consequently the powder coating is improved, because the bulk of the powder lands in the melt pool on the substrate surface 2, without excess overspray.

The spray nozzle 10 can deposit a focussed powder sheet (or stream) which does not diverge to the same extent as powder ejected from conventional nozzles. This means that the spray nozzle 10 can be located further away from the surface of the substrate which the coating is to be deposited on, without reducing the uniformity of the coating layer deposited.

The guide plates 34, 36 help to guide the powder and the carrier gas. Since the upper guide plate 34 is longer than the lower guide plate 36 the spray nozzle 10 can be used at an angle relative to the substrate surface whilst ensuring that the guide plates 34, 36 fulfil their function of guiding the powder and the carrier gas.

The composition of the carrier gas that exits the elongate gas apertures 26, 28 may be the same as the composition of the carrier gas used to deliver the metal powder; this may help to avoid mixing of gases. The carrier gas exiting the elongate gas apertures 26, 28 may exit at a different velocity from the powder sheet exiting the array of nozzle apertures 16. Further, the carrier gas exiting the elongate gas apertures 26, 28 may be at a higher temperature than that of the powder sheet so that the gas pre-heats the powder sheet before it interacts with the laser beam 104.

The individual valves 21 can regulate the flow through the individual nozzle apertures. This is particularly useful if the spray nozzle 10 is performing a relatively tight arc in the plane of the substrate surface. The nozzle apertures 16 towards the radially inner side of the arc, which are travelling relatively slowly, are choked to reduce the flow rate of powder exiting the nozzle apertures when compared to the flow rate of powder exiting the nozzle apertures on the radially outer side of the arc, which are travelling relatively fast. This helps to ensure that the thickness of the coating is substantially even.

FIG. 11 shows a further embodiment which is similar to that of FIGS. 9 and 10 except the guide plates 34, 36 are pivotable with respect to the nozzle body 14 and the outer walls 15, 17. This allows the powder and gas streams to be directed. In an alternative arrangement the guide plates 34, 36 are capable of moving forwards and backwards with respect to the direction of flow of the powder stream issuing from the array of nozzle apertures 16.

In some embodiments it may be possible to tilt or twist the spray nozzle 10 about a central axis located along the length of the spray nozzle 16. This has the effect of reducing the width of the coating deposited whilst maintaining a uniform thickness.

The spray nozzle 10 may be cooled by either the carrier gas exiting the elongate gas apertures 26, 28 or by a closed cooling system such as a water jacket.

It may be desirable to use two or more spray nozzles 10 with the laser cladding apparatus 100. For example, two nozzles 10 may be arranged side-by-side, on top of one another, or positioned either side of the laser beam 104 but directed towards the same target.

The present invention enables a laser deposition apparatus to be provided which improves powder usage efficiency, improves the powder catchment rate, and minimises the thermal disruption per unit mass added.

Although it has been described that the spray nozzle 10 is for use with a laser cladding apparatus 100, as will be readily apparent to one skilled in the art, the spray nozzle 10 may be used with other types of laser deposition apparatus such as laser welding, brazing or soldering.

The invention claimed is:

1. A spray nozzle for a laser deposition apparatus, comprising:
    an array of nozzle apertures arranged side-by-side; and
    a powder supply chamber in concurrent fluid communication with each of the array of nozzle apertures and arranged in use to supply powder to the array of nozzle apertures under pressure so as to cause a wide powder sheet to be ejected from the array of nozzle apertures, wherein at least one nozzle aperture of the array of nozzle apertures is provided with a controllable flow regulator configured to alter the flow rate of powder through the at least one nozzle aperture within the array of nozzle apertures, the controllable flow regulator being disposed within the at least one nozzle aperture.

2. A spray nozzle according to claim 1, wherein the array of nozzle apertures is a linear array.

3. A spray nozzle according to claim 1, wherein the nozzle apertures in the array of nozzles are of differing sizes.

4. A spray nozzle according to claim 3, wherein the nozzle apertures towards the edges of the array are larger than the nozzle apertures towards the middle of the array.

5. A spray nozzle according to claim 1, wherein each nozzle aperture of the array is provided with an individual controllable flow regulator configured to alter the flow rate of powder through the nozzle aperture.

6. A spray nozzle according to claim 1, further comprising upper and lower elongate gas apertures located above and below the array of nozzle apertures respectively and extending substantially parallel to the array of nozzle apertures, wherein the upper and lower elongate apertures are arranged to eject a wide gas stream above and below the wide powder sheet.

7. A spray nozzle according to claim 1, further comprising upper and lower guide plates located above and below the array of nozzle apertures respectively and extending so as to guide the flow of powder ejected from the spray nozzle in use.

8. A spray nozzle according to claim 1, wherein a wall of the powder supply chamber is provided with ribs which extend generally in the direction of flow through the powder supply chamber in use.

9. A spray nozzle according to claim 1, wherein the array of nozzle apertures is formed in a nozzle body.

10. A laser deposition apparatus comprising a laser arranged to generate a wide laser beam and a spray nozzle in accordance with claim 1.

11. A spray nozzle according to claim 1, wherein the controllable flow regulator is provided in the form of a valve.

* * * * *